(12) United States Patent
Fujita

(10) Patent No.: US 7,300,487 B2
(45) Date of Patent: Nov. 27, 2007

(54) SEALING MATERIAL, METHOD FOR SEALING HONEYCOMB STRUCTURE AND SEALED HONEYCOMB STRUCTURE

(75) Inventor: Jun Fujita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 443 days.

(21) Appl. No.: 10/505,612

(22) PCT Filed: Feb. 5, 2003

(86) PCT No.: PCT/JP03/01158

§ 371 (c)(1),
(2), (4) Date: Aug. 20, 2004

(87) PCT Pub. No.: WO03/074624

PCT Pub. Date: Sep. 12, 2003

(65) Prior Publication Data

US 2005/0115215 A1    Jun. 2, 2005

(30) Foreign Application Priority Data

Mar. 5, 2002    (JP) ............................. 2002-058641

(51) Int. Cl.
*C09K 3/10* (2006.01)
*B01D 39/20* (2006.01)

(52) U.S. Cl. .................. 55/523; 428/116; 501/15; 501/17; 501/20

(58) Field of Classification Search ................. 55/502, 55/523, DIG. 5, DIG. 30; 60/297, 311; 428/116, 428/117, 118; 501/1, 15, 17, 20
See application file for complete search history.

(56) References Cited

U.S. PATENT DOCUMENTS

| | | | | |
|---|---|---|---|---|
| 4,297,140 A | * | 10/1981 | Paisley | ..................... 428/312.6 |
| 4,455,180 A | * | 6/1984 | Hillman et al. | ............. 264/631 |
| 4,568,402 A | * | 2/1986 | Ogawa et al. | ........... 156/89.22 |
| 2002/0066982 A1 | | 6/2002 | Yamaguchi et al. | |
| 2002/0175451 A1 | * | 11/2002 | Vance et al. | ................. 264/631 |
| 2003/0162883 A1 | * | 8/2003 | Fabian et al. | ................ 524/494 |

FOREIGN PATENT DOCUMENTS

| EP | 0 752 399 A2 | 1/1997 |
|---|---|---|
| JP | A 8-281035 | 10/1996 |
| JP | A 9-25180 | 1/1997 |
| JP | A 10-337427 | 12/1998 |
| JP | A 2000-102708 | 4/2000 |

* cited by examiner

Primary Examiner—Frank M. Lawrence
(74) Attorney, Agent, or Firm—Oliff & Berridge, PLC

(57) ABSTRACT

There is disclosed a sealing material for sealing a ceramic structure, the sealing material containing a ceramic component, an ordinary-temperature liquid component, and a suspending agent. In a method in which opening end portions of a large number of through channels 3 divided by partition walls 2 and extending in an axial direction in a honeycomb structure 1 including the through channels, the method comprises the steps of: sealing the opening end portions using the above-described sealing material. Sealed portions 10 are formed in the opening end portions of the through channels 3 by the sealing material. There are disclosed a sealing material, a sealing method for a honeycomb structure, and a sealed honeycomb structure in which less kinks are generated in the sealed portions, and a depth in each sealed portion fluctuates little.

15 Claims, 4 Drawing Sheets

PRIOR ART

PRIOR ART

US 7,300,487 B2

SEALING MATERIAL, METHOD FOR SEALING HONEYCOMB STRUCTURE AND SEALED HONEYCOMB STRUCTURE

TECHNICAL FIELD

The present invention relates to a sealing material for a ceramic structure, a sealing method for a honeycomb structure, and a sealed honeycomb structure, particularly to a sealing material which does not easily generate kinks in a sealed portion and which has little fluctuation in a sealed depth of the sealed portion, a sealing method for a honeycomb structure, and a sealed honeycomb structure.

BACKGROUND ART

Ceramic structures such as honeycomb structures have been used in filters for capturing particulates, particularly diesel particulates in exhaust gases of internal combustion engines, boilers and the like.

In general, as shown in FIGS. 5(a) and (b), the ceramic structure used for this purpose, for example, the honeycomb structure has a structure including a large number of through channels 3 divided by partition walls 2 and extending in an X-axis direction, and sealed portions in which adjacent through channels 3 are sealed in end portions on opposite sides in such a manner that end surfaces have checkered patterns. In the honeycomb structure having this structure, fluid to be treated flows in the through channel 3 which does not have the sealed portion in one end surface 42, that is, the through channel 3 which has the sealed portion in the other end surface 44, and is discharged from the adjacent through channel 3 through a porous partition wall 2, that is, the through channel 3 which has the sealed portion in one end surface 42 and which does not have the sealed portion in the other end surface 44. In this case, the partition walls 2 function as filters. For example, soot and the like discharged from a diesel engine are captured by the partition walls and deposited on the partition walls.

However, kinks are sometimes generated in sealed portions 10 as shown in FIG. 6, and there has been a problem that a filter function is deteriorated by the generation of kinks 20. Fluctuations are also easily generated in depths x of the sealed portions 10, and the filter function has also been adversely affected.

DISCLOSURE OF THE INVENTION

The present invention has been developed in consideration of these situations, and a first object is to provide a sealing material which seals a ceramic structure and which does not easily generate any kink in a sealed portion and which has little fluctuation of a sealed depth in the sealed portion. A second object is to provide a sealing method of a honeycomb structure in which kinks are not easily generated in sealed portions and which has little fluctuation of a sealed depth in each sealed portion. A third object is to provide a honeycomb structure in which less kinks are generated in sealed portions and which has little fluctuation of a sealed depth in each sealed portion.

As a result of intensive studies performed to solve the above-described problems, the present inventors have found that evaporation of an ordinary-temperature liquid component, for example, a water content non-uniformly occurs and shape defects referred to as kinks are caused by non-uniform drying in a drying step after the sealing, and that the kinks can be inhibited from being generated by addition of a suspending agent and further a fluctuation of a depth x of a sealed portion 20 can be suppressed.

The present invention is based on the above-described finding, and first provides a sealing material which seals a ceramic structure and characterized in that the sealing material contains a ceramic component, an ordinary-temperature liquid component, and a suspending agent.

In the present invention, it is preferable to contain 10 to 50 parts by mass of the ordinary-temperature liquid component, and 0.01 to 10 parts by mass of a suspending agent with respect to 100 parts by mass of the ceramic component. The suspending agent preferably comprises one or two or more selected from a group consisting of calcium sulfate, magnesium sulfate, gluconodeltalactone, calcium chloride, and magnesium chloride. The ordinary-temperature liquid component is preferably water. The ceramic component preferably comprises one or two or more selected from a group consisting of cordierite, mullite, alumina, spinel, silicon carbide, silicon carbide-cordierite-based composite material, silicon-silicon carbide-based composite material, silicon nitride, lithium aluminum silicate, and aluminum titanate.

The present invention secondly provides a sealing method in which opening end portions of a large number of through channels divided by partition walls and extending in an axial direction in a honeycomb structure including the through channels, the method characterized by the steps of: sealing the opening end portions using the above-described sealing material.

The present invention thirdly provides a honeycomb structure including a large number of through channels divided by partition walls and extending in an axial direction, predetermined through channels having opening end portions sealed, characterized in that the opening end portions are sealed using the above-described sealing material.

BEST MODE FOR CARRYING OUT THE INVENTION

A sealing material, a sealing method for a honeycomb structure, and a sealed honeycomb structure of the present invention will be described hereinafter in detail, and the present invention is not limited to the following embodiment.

Figure 4:
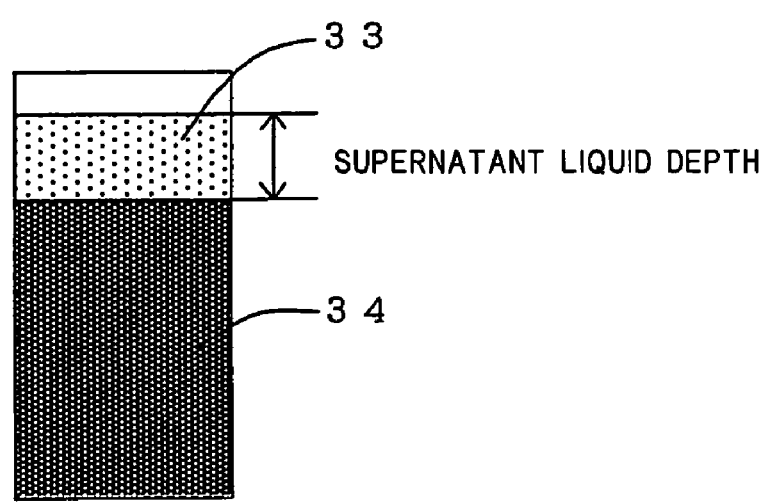
FIG. 4 is a diagram schematically showing separation/precipitation of a sealing material.
Figure 5A:
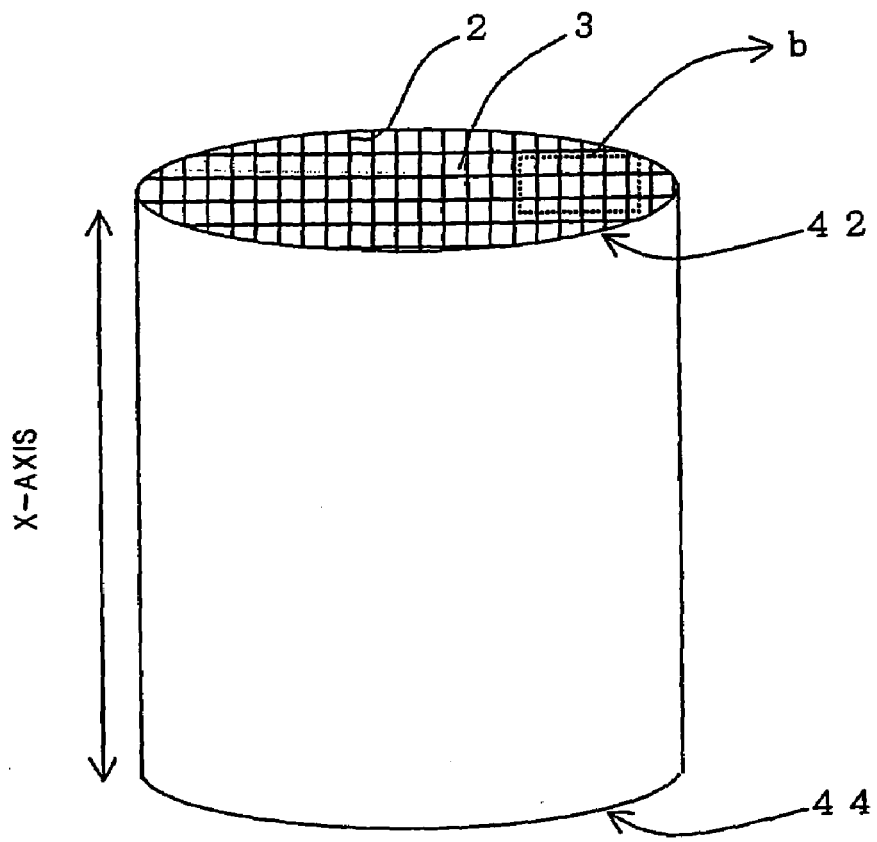
FIG. 5(a) is a schematic perspective view showing a conventional honeycomb structure.
Figure 5B:
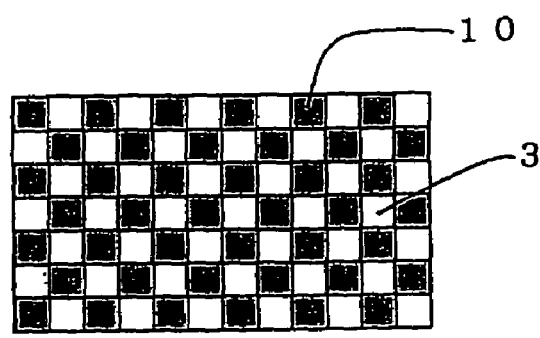
FIG. 5(b) is a partially enlarged view of a part shown by b in FIG. 5(a)

The sealing material of the present invention contains a ceramic component, an ordinary-temperature liquid component, and a suspending agent. Important characteristics of the present invention are that the sealing material contains the suspending agent. In the present invention, the suspending agent has an effect of preventing the ceramic component from precipitating in the ordinary-temperature liquid component. The effect indicates that after the agent is added to and mixed with 100 parts by mass of the ceramic component and 30 parts by mass of the ordinary-temperature liquid component for use as the sealing material, and allowed to stand for seven days, the mixture does not substantially cause separation/precipitation as shown in FIG. 4.

Figure 3:
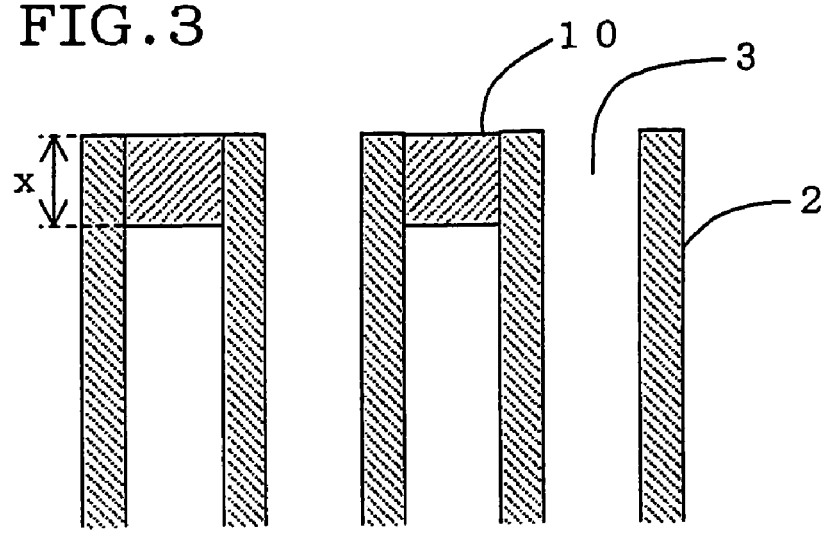
FIG. 3 is a partially enlarged view of a part shown by III in FIG. 2.
Figure 6:
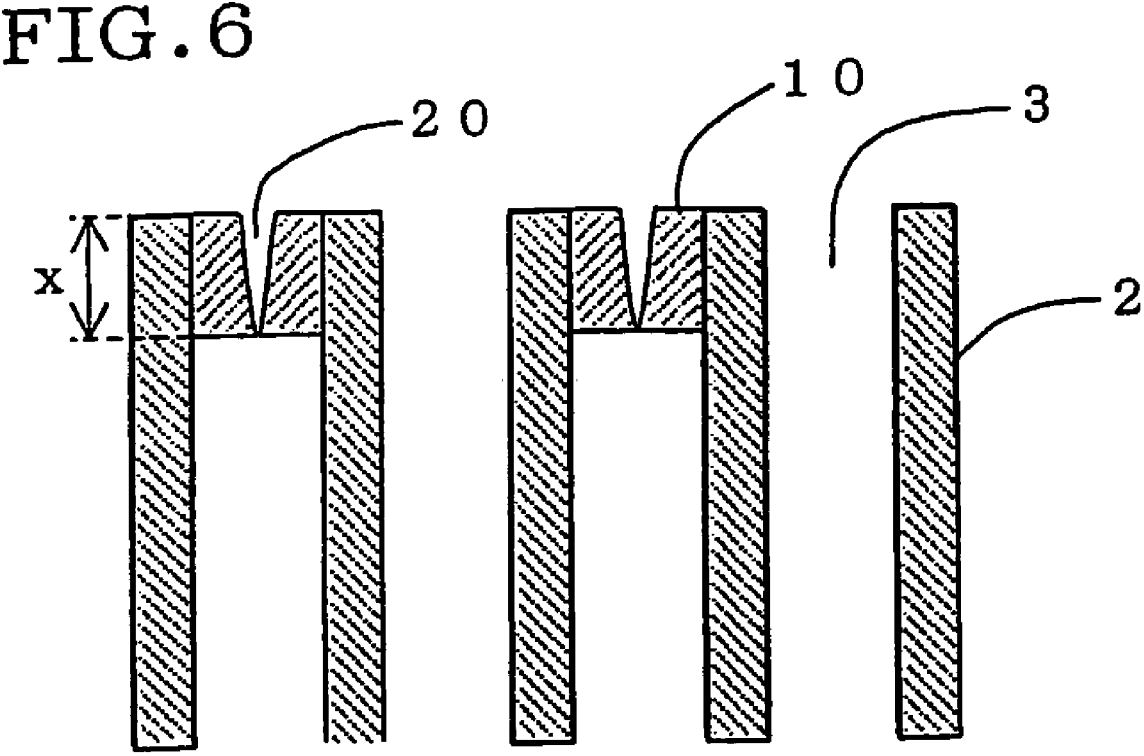
FIG. 6 is a schematic sectional enlarged view showing a part corresponding to FIG. 3 in the conventional honeycomb structure.

The sealing material of the present invention contains the suspending agent having the above-described effect to such an extent that the precipitation preventive effect is indicated. Accordingly, when the sealing material is used for sealing openings of a ceramic structure, for example, opening end surfaces of through channels 3 divided by partition walls 2 in the honeycomb structure shown in FIG. 1, kinks 20 shown in FIG. 6 are inhibited from being generated in formed sealed portions 10, and fluctuations of a depth x of each sealed portion 10 are reduced. Thus, sealed portions which do not have any kink and in which each depth x has little fluctuation as shown in FIG. 3 can be provided.

Concrete examples of the suspending agent having the above-described effect include calcium sulfate, magnesium sulfate, gluconodeltalactone, calcium chloride, magnesium chloride and the like. Above all, magnesium chloride is especially preferable.

A content of the suspending agent is not especially limited. When the content is excessively large, viscosity excessively rises, and this causes a defect that the ceramic component aggregate. When the content is excessively small, the effect of the present invention is not obtained. The content of the suspending agent is preferably 0.01 to 10 parts by mass, further preferably 0.1 to 5.0 parts by mass, most preferably 0.2 to 2.0. parts by mass.

In the present invention, the ceramic component constitutes a main component of the sealing material, and generally has a powder form. When the sealing material is applied and dried/calcined, the component is hardened to form the sealed portions 10, and fulfills a sealing effect. Examples of the preferable ceramic component include one or two or more of cordierite, mullite, alumina, spinel, silicon carbide, silicon carbide-cordierite-based composite material, silicon-silicon carbide-based composite material, silicon nitride, lithium aluminum silicate, aluminum titanate and the like. From standpoints of adhesion to the ceramic structure to be sealed, the component is preferably similar to the component constituting the applied ceramic structure. The ceramic component may also have a needle or fiber form, and a plurality of components having different forms may also be combined.

In the present invention, the ordinary-temperature liquid component disperses the ceramic component and facilitates the application. In general, after the sealing material is applied, the component evaporates in the process of drying/calcining, and does not remain in the formed sealed portions 10. The component is preferably a liquid which is capable of dispersing the ceramic component and which evaporates at an appropriate temperature, and concretely water, glycerin or the like is preferable.

The content of the ordinary-temperature liquid component is not especially limited. When the content is excessively large, viscosity excessively drops, it becomes difficult to apply the component in a desired thickness, and a drying time unfavorably lengthens. On the other hand, when the content is excessively small, it unfavorably becomes difficult to handle the component at an applying time. The content of the ordinary-temperature liquid component is preferably 5 to 60 parts by mass, further preferably 15 to 50 parts by mass, most preferably 25 to 35 parts by mass with respect to 100 parts by mass of the ceramic component.

The sealing material of the present invention is capable of containing various additives in addition to the ceramic component, ordinary-temperature liquid component, and suspending agent, as long as the effect of the present invention is not lost. For example, the material is capable of containing methyl cellulose, hydroxypropoxyl methyl cellulose, surfactant and the like.

The sealing material of the present invention is especially effective as the sealing material for sealing, that is, plugging the through channels of the honeycomb structure, but the use of the sealing material of the present invention is not limited to this, and the material may also be broadly used as a sealing material of a ceramic structure, that is, a ceramic body having a certain structure, for example, as a sealing material of a filter for water treatment.

Figure 1A:
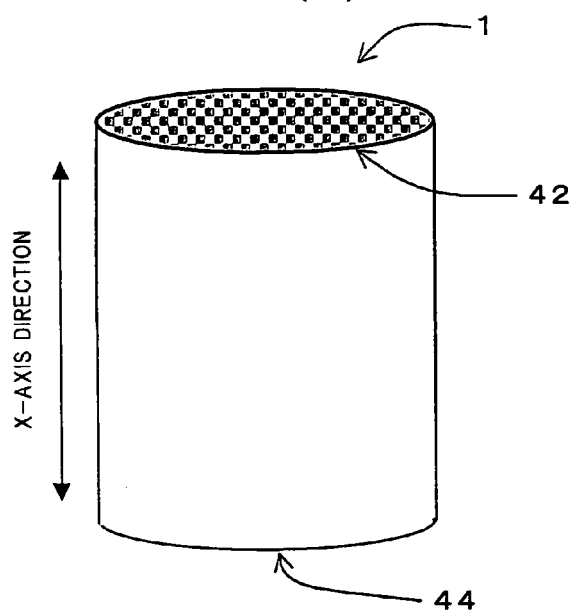
FIG. 1(a) is a schematic perspective view showing a configuration of a honeycomb structure of the present invention.
Figure 1B:
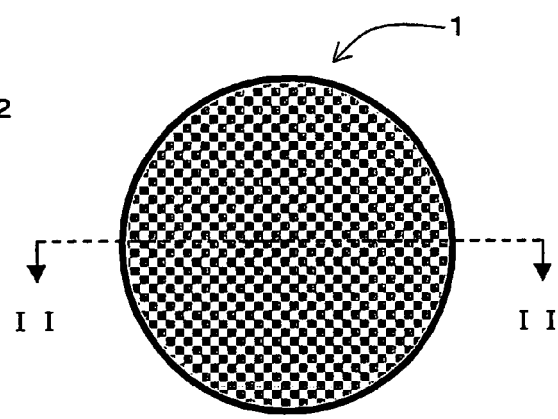
FIG. 1(b) is a schematic plan view showing the configuration of the honeycomb structure of the present invention.

Next, a method of sealing a honeycomb structure using the sealing material of the present invention will be described. The honeycomb structure in the present invention has a large number of through channels 3 divided by partition walls 2 and extending in an X-axis direction as shown in FIGS. 1(*a*), (*b*), and 2. Among a large number of through channels 3, excluding the desired through channels 3 to be sealed in one end surface, for example, an end surface 42, openings of the other through channels 3 are masked by masking materials such as masking tapes.

Next, the above-described sealing material is applied to one masked end surface. An applying method is not especially limited, but examples of the method include a press-in system in which the sealing material is disposed in a container to press the honeycomb structure in the container, dipping, coating by a brush or the like, coating by spraying and the like. When this material is dried and calcined, the sealed portions 10 are formed, and the desired through channels 3 can be sealed in one end surface 42.

The opposite end surfaces are preferably sealed by the sealing material, further preferably the openings of the predetermined through channels 3 are sealed in one end surface, and the openings of the remaining through channels are sealed in the other end surface. In this case, as shown in FIG. 1(*b*), the openings of the through channels 3 are preferably alternately sealed in one end surface and the other end surface so that the openings of the through channels have a checked pattern as shown in FIG. 1(*b*).

In the present invention, the honeycomb structure which is an object to be sealed can be manufactured, for example, by the following method.

For example, a silicon carbide powder is used as a material powder of the honeycomb structure, binders such as methyl cellulose and hydroxypropoxyl methyl cellulose are added to the powder, and further the surfactant and water are added to prepare a plastic clay. The clay is extruded/formed to obtain a formed body of the honeycomb structure including a large number of through channels divided by the partition walls and extending in an axial direction.

This body is dried, for example, by microwave and hot air, heated/degreased, for example, in an $N_2$ atmosphere, and thereafter calcined in an inactive atmosphere of Ar or the like so that the honeycomb structure can be obtained.

The sealing method of the present invention may be performed in any stage after the honeycomb formed body is formed in a manufacturing process of the honeycomb structure. For example, the method may also be performed with respect to the honeycomb structure obtained, for example, after the calcining, or may also be performed with respect to the honeycomb formed body before the calcining, after the honeycomb formed body is formed and dried. In this case, there is a merit that the calcining step may be performed once.

In the present invention, in the honeycomb structure, a plurality of honeycomb segments may also be bonded/integrated. In this case, after forming the honeycomb segments, the segments may also be sealed before or after the bonding. The honeycomb segments may be preferably bonded, for example, when a bonding material is applied to the surfaces of the honeycomb segments to be bonded, and the honeycomb segments are pressed/bonded and thereafter dried/heated. Examples of the bonding material for use in the bonding preferably include materials mixed with inorganic fibers such as ceramic fibers, inorganic powders such as ceramic powders, an organic/inorganic binders and the like. Furthermore, sol substances such as Si sols may also preferably be contained in the bonding material.

In the present invention, from standpoints of strength, heat resistance and the like, the main component of a honeycomb structure 1 preferably comprises at least one type of material selected from a group consisting of cordierite, mullite, alumina, spinel, silicon carbide, silicon carbide-cordierite-based composite material, silicon-silicon carbide-based composite material, silicon nitride, lithium aluminum silicate, aluminum titanate, Fe—Cr—Al-based metal, and a combination of these materials. From the standpoints of thermal conductivity and heat resistance, silicon carbide or silicon-silicon carbide composite material is especially preferable. Here, the "main component" means that the component constitutes 50% by mass or more, preferably 70% by mass or more, further preferably 80% by mass or more. Moreover, in the present invention, when the honeycomb structure contains a composite material of metal silicon (Si) and silicon carbide (SiC) as the main component, and when an Si content defined by Si/(Si+SiC) of the honeycomb structure is excessively small, an effect of Si addition is not easily obtained. With the content exceeding 50% by mass, the effects of the heat resistance and high thermal conductivity which are the characteristics if SiC are not easily obtained. Therefore, the Si content is preferably 5 to 50% by mass, further preferably 10 to 40% by mass.

In the present invention, the partition walls of the honeycomb structure are preferably porous bodies which fulfill functions of filters. A thickness of the partition wall is not especially limited. However, when the partition wall is excessively thick, a pressure loss at the time of transmission of a fluid to be treated through the porous partition walls becomes excessively large. When the partition wall is excessively thin, the strength of the filter becomes insufficient unfavorably. The thickness of the partition wall is in a range of preferably 30 to 2000 μm, further preferably 40 to 1000 μm, most preferably 50 to 500 μm.

In the present invention, a cell density (the number of through channels per unit sectional area) of the honeycomb structure is not especially limited. However, when the cell density is excessively small, the strength and effective geometric surface area (GSA) of the filter become insufficient. When the cell density is excessively large, a pressure loss in the flowing of the fluid to be treated increases. The cell density is in a range of preferably 6 to 2000 cells/square inch (0.9 to 311 cells/cm$^2$), further preferably 50 to 1000 cells/square inch (7.8 to 155 cells/cm$^2$), most preferably 100 to 400 cells/square inch (15.5 to 62.0 cells/cm$^2$). A sectional shape (cell shape) of the through channel 3 is not especially limited, but from the standpoints in preparation, any one of triangular, quadrangular, hexagonal, and corrugated shapes is preferable.

Figure 2:
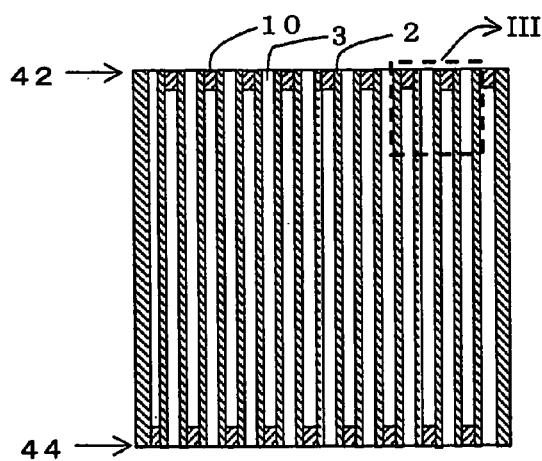
FIG. 2 is a schematic sectional view of a II-II section in FIG. 1(b)

The sectional shape of the honeycomb structure of the present invention is not especially limited. For example, in addition to the circular shape shown in FIG. 2, polygonal shapes or unusual shapes may be formed such as an elliptic shape, race track shape, oblong shape, triangular shape, schematically triangular shape, quadrangular shape, and substantially quadrangular shape. Moreover, the thermal conductivity of the honeycomb structure is not especially limited, but from standpoints of balances of a heat retaining property and a heat radiating property, a thermal conductivity at 40° C. is preferably 10 to 60 W/mK.

In the present invention, when the honeycomb structure 1 includes a plurality of bonded/integrated honeycomb segments, and when each segment is excessively large, a problem of breakage by a thermal stress occurs. When the segment is excessively small, the integration by the manufacturing or bonding of the respective segments unfavorably becomes intricate. In a preferable size of the honeycomb segment, a sectional area is 900 mm$^2$ to 1000 mm$^2$, and 70% by volume or more of the honeycomb structure is preferably constituted of the honeycomb segments having this size. The shape of the honeycomb segment is not especially limited, but a quadrangular sectional shape, that is, the honeycomb segment having a square pole shape is regarded as a basic shape, and the shape of the honeycomb segment on an outer peripheral side can appropriately be selected in accordance with the shape of the honeycomb structure in which the basic shapes are integrated.

To use the honeycomb structure of the present invention as a catalyst carrier in purifying exhaust gases of thermal engines such as internal combustion engines or combustion devices such as boilers, in modifying a liquid fuel or a gas fuel, or in DPF or the like, the honeycomb structure of the present invention is preferably allowed to carry a catalyst, for example, a metal having a catalytic capability. Representative examples of the metal having the catalytic capability include Pt, Pd, Rh, and the like, and the honeycomb structure is preferably allowed to carry at least one of these metals.

The present invention will be described hereinafter in further detail based on examples, but the present invention is not limited to these examples.

EXAMPLES 1 TO 4

With respect to 100 parts by mass in total of a ceramic component containing 80 parts by mass of silicon carbide (SiC) and 20 parts by mass of metal silicon, 30 parts by mass of water which was an ordinary-temperature liquid component, 0.01 to 10 parts by mass of magnesium chloride, shown in Table 1, which was a suspending agent, and further 10 parts by mass of an organic auxiliary agent were added and mixed to prepare sealing materials B to E.

COMPARATIVE EXAMPLE 1

The sealing material A was prepared in the same manner as in Example 1 except that any suspending agent was not used.

TABLE 1

|  | Comparative example 1 | Example 1 | Example 2 | Example 3 | Example 4 |
|---|---|---|---|---|---|
| Sealing agent | A | B | C | D | E |
| Composition of sealing agent | [Parts by mass] | [Parts by mass] | [Parts by mass] | [Parts by mass] | [Parts by mass] |
| SiC | 80 | 80 | 80 | 80 | 80 |
| Si | 20 | 20 | 20 | 20 | 20 |
| Organic auxiliary agent | 10 | 10 | 10 | 10 | 10 |
| Mg chloride | — | 0.01 | 1 | 5 | 10 |
| Water | 30 | 30 | 30 | 30 | 30 |

(Evaluation of Suspending Effect)

Each of the sealing materials obtained in Examples 1 to 4 and Comparative Example 1 was stirred, put into a testing tube to have a height of about 5 cm, and allowed to stand for seven days. It was judged as an index whether or not precipitation 34 and supernatant 33 were generated as shown in FIG. 4, and presence/absence of separation/precipitation was evaluated. Results are shown in Table 2. After the sealing material A obtained in Comparative Example 1 was allowed to stand for two days, the supernatant was generated in a height of 3 mm, and this indicated occurrence of separation/precipitation. On the other hand, after the sealing material B obtained in Example 1 was allowed to stand for seven days, 1 mm of supernatant was confirmed. However, even after the sealing materials C to E obtained Examples 2 to 4 were allowed to stand for seven days, any supernatant was not confirmed, and it was indicated in Examples 1 to 4 that the separation/precipitation did not substantially occur.

TABLE 2

| | Supernatant depth (mm) | | | | |
|---|---|---|---|---|---|
| Days for leaving | Sealing agent A (Comp. Ex. 1) | Sealing agent B (Ex. 1) | Sealing agent C (Ex. 2) | Sealing agent D (Ex. 3) | Sealing agent E (Ex. 4) |
| 1 | 0 | 0 | 0 | 0 | 0 |
| 2 | 3 | 0 | 0 | 0 | 0 |
| 3 | 8 | 0 | 0 | 0 | 0 |
| 7 | 12 | 1 | 0 | 0 | 0 |

EXAMPLE 5

As a raw material, 80 parts by mass of SiC powder and 20 parts by mass of metal Si powder were mixed, and methyl cellulose, hydroxypropoxyl methyl cellulose, surfactant, and water were added to prepare a plastic clay. The clay was extruded/molded, and dried by microwave and hot air to obtain a honeycomb structure having a thickness of the partition wall of 380 μm, a cell density of about 31.0 cells/cm$^2$ (200 cells/square inch), a square section having each side of 35 mm, and a length of 152 mm.

The sealing material B obtained in Example 1 was used with respect to the honeycomb structure, and the sealing material was disposed in a container including an opening having a dimension equal to that of an outer shape of the honeycomb structure in one end portion in which adjacent through channels are on opposite sides, so that the end surface of the honeycomb structure had a checkered pattern. After the sealing material was flattened in the container, the material was pressed and applied into the container, dried, thereafter degreased in the atmosphere, and calcined at about 1450° C. to obtain a honeycomb structure in which the opening end portions of the through channels were plugged, that is, sealed.

EXAMPLES 6 TO 8 AND COMPARATIVE EXAMPLE 2

A honeycomb structure was obtained in the same manner as in Example 5 except that the sealing materials obtained in Examples 1 to 4 and Comparative Example 1 were used as the sealing materials.

The presence/absence of kinks and the depth of the sealed portion were measured in the honeycomb structures obtained in Examples 5 to 8 and Comparative Example 2. The presence/absence of kinks and fluctuations (standard deviations) of the sealed depth are shown in Table 3. As seen from the results shown in Example 3, the kinks were confirmed, and the fluctuations of the sealed depth were also large in the honeycomb structure obtained in Comparative Example 2. On the other hand, any kink was not confirmed, and the sealed depth fluctuated little in the honeycomb structures obtained in Examples 5 to 8.

TABLE 3

| Sealing agent | Comparative example 2 Sealing agent A (Comp. Ex.1) | Example 5 Sealing agent B (Ex.1) | Example 6 Sealing agent C (Ex. 2) | Example 7 Sealing agent D (Ex. 3) | Example 8 Sealing agent E (Ex. 4) |
|---|---|---|---|---|---|
| Presence/absence of kinks | Present | None | None | None | None |
| Plugged depth fluctuation | σ = 1.10 | σ = 0.50 | σ = 0.26 | σ = 0.40 | σ = 0.65 |

INDUSTRIAL APPLICABILITY

As described above, since a sealing material of the present invention contains a suspending agent, kinks are not easily generated in formed sealed portions, and a depth in each sealed portion fluctuates little in the sealing material. The sealing material is used in a sealing method of the present invention, and therefore a honeycomb structure is obtained in which the kinks are not easily generated in the formed sealed portions, and the depth in each sealed portion fluctuates little. Furthermore, since the kinks are reduced in the sealed portions, and the depth in each sealed portion fluctuates little, the honeycomb structure of the present invention is preferably usable in a filter for capturing particulates in exhaust gas of an internal combustion engine, boiler or the like, particularly diesel particulates. It is to be noted that the sealing material of the present invention preferably seals through channels of the honeycomb structure. As effects of the present invention, the kinks are reduced, and the sealed depth is uniform. Therefore, the sealing material is also preferable for a ceramic structure having another structure, and is usable in a ceramic structure having any configuration.

The invention claimed is:

1. A sealing material for sealing a ceramic structure, comprising a ceramic component, an ordinary-temperature liquid component, and a suspending agent, wherein the suspendending agent has an effect of preventing the ceramic component from precipitating in the ordinary-temperature liquid component.

2. The sealing material according to claim 1, wherein there are 10 to 50 parts by mass of the ordinary-temperature liquid component; and 0.01 to 10 parts by mass of the suspending agent with respect to 100 parts by mass of the ceramic component.

3. The sealing material according to claim 1, wherein the suspending agent comprises one or two or more selected from a group consisting of calcium sulfate, magnesium sulfate, gluconodeltalactone, calcium chloride, and magnesium chloride.

4. The sealing material according to claim 1, wherein the ordinary-temperature liquid component is water.

5. The sealing material according to claim 1, wherein the ceramic component comprises one or two or more selected from a group consisting of cordierite, mullite, alumina, spinel, silicon carbide, silicon carbide-cordierite-based composite material, silicon-silicon carbide-based composite material, silicon nitride, lithium aluminum silicate, and aluminum titanate.

6. A sealing method in which opening end portions of a large number of through channels divided by partition walls and extending in an axial direction in a honeycomb structure including the through channels, the method comprising the steps of: sealing the opening end portions using a sealing material, the sealing material comprising a ceramic component, an ordinary-temperature liquid component, and a suspending agent, wherein the suspending agent has an effect of preventing the ceramic component from precipitating in the ordinary-temperature liquid component.

7. The sealing method according to claim 6, wherein there are 10 to 50 parts by mass of the ordinary-temperature liquid component; and 0.01 to 10 parts by mass of the suspending agent with respect to 100 parts by mass of the ceramic component.

8. The sealing method according to claim 6, wherein the suspending agent comprises one or two or more selected from a group consisting of calcium sulfate, magnesium sulfate, gluconodeltalactone, calcium chloride, and magnesium chloride.

9. The sealing method according to claim 6, wherein the ordinary-temperature liquid component is water.

10. The sealing method according to claim 6, wherein the ceramic component comprises one or two or more selected from a group consisting of cordierite, mullite, alumina, spinel, silicon carbide, silicon carbide-cordierite-based composite material, silicon-silicon carbide-based composite material, silicon nitride, lithium aluminum silicate, and aluminum titanate.

11. A honeycomb structure comprising: a large number of through channels divided by partition walls and extending in an axial direction, predetermined through channels having opening end portions sealed, wherein the opening end portions are sealed using a sealing material which comprises a ceramic component, an ordinary-temperature liquid component, and a suspending agent, wherein the suspending agent has an effect of preventing the ceramic component from precipitating in the ordinary-temperature liquid component.

12. The honeycomb structure according to claim 11, wherein there are 10 to 50 parts by mass of the ordinary-temperature liquid component; and 0.01 to 10 parts by mass of the suspending agent with respect to 100 parts by mass of the ceramic component.

13. The honeycomb structure according to claim 11, wherein the suspending agent comprises one or two or more selected from a group consisting of calcium sulfate, magnesium sulfate, gluconodeltalactone, calcium chloride, and magnesium chloride.

14. The honeycomb structure according to claim 11, wherein the ordinary-temperature liquid component is water.

15. The honeycomb structure according to claim 11, wherein the ceramic component comprises one or two or more selected from a group consisting of cordierite, mullite, alumina, spinel, silicon carbide, silicon carbide-cordierite-based composite material, silicon-silicon carbide-based composite material, silicon nitride, lithium aluminum silicate, and aluminum titanate.

* * * * *